Dec. 16, 1958   R. J. OLSON ET AL   2,864,446
TAPE DISPENSER
Filed March 4, 1955
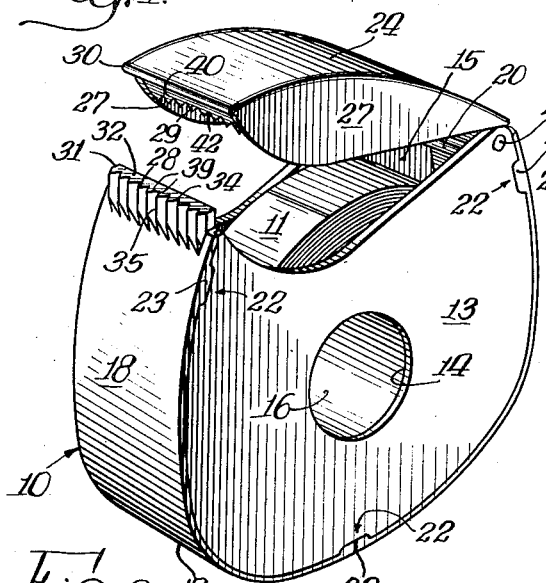
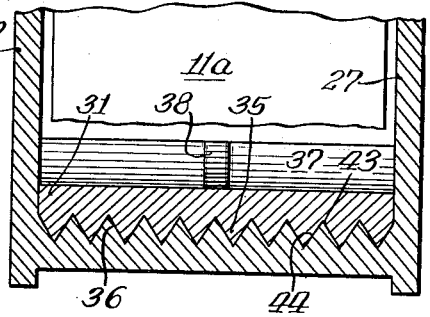
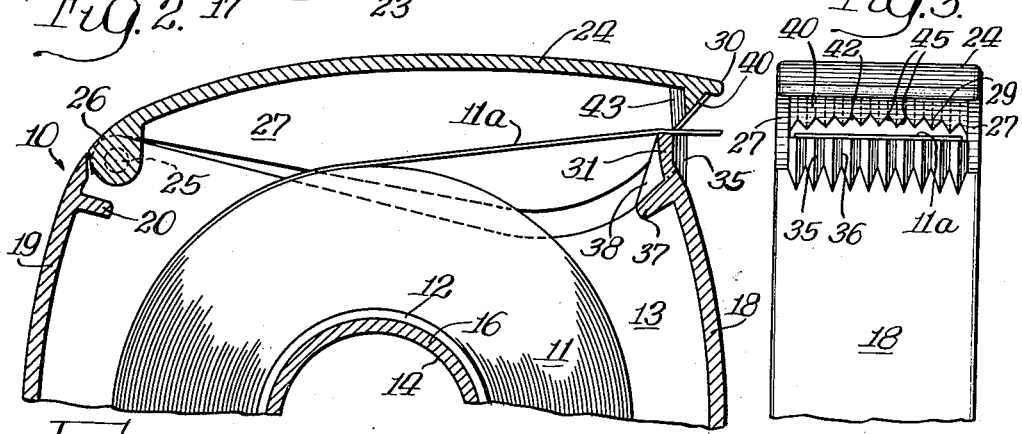
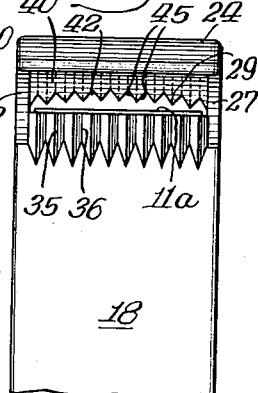
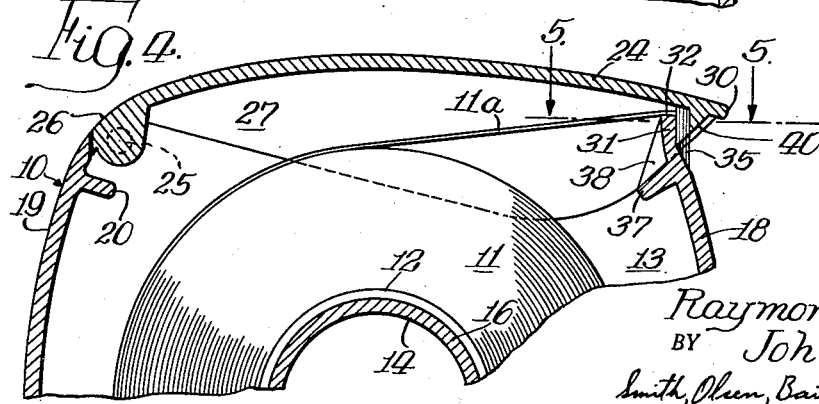
INVENTORS.
Raymond J. Olson,
BY John E. Press,
Smith, Olsen, Baird & Gulbrandsen
Attys.

United States Patent Office 2,864,446
Patented Dec. 16, 1958

2,864,446

TAPE DISPENSER

Raymond J. Olson, Skokie, and John E. Press, Niles, Ill., assignors to Federal Tool Corporation, Chicago, Ill., a corporation of Illinois Application March 4, 1955, Serial No. 492,237

5 Claims. (Cl. 164—41)

The present invention relates to tape dispensers and more particularly to apparatus especially useful for dispensing and severing tape of the pressure sensitive adhesive type.

In the past, tape dispensers of various constructions have been provided for dispensing and severing the ordinary type cloth-backed adhesive tape which can readily be ripped or torn to desired length. However, these earlier dispensers have proven unsatisfactory for use with recently developed elastomeric type adhesive tapes which are relatively difficult to server because of their tough, resilient, rubber-like qualities which cause them to tend to stretch rather than tear or rip. The new elastomeric tapes can of course be cut by closely ground metallic shears and the like, but such devices cannot economically be embodied in handy, inexpensive dispensers. Moreover, neither the materials that are economically feasible for use in inexpensive dispensers, such as plastics and relatively soft metals, nor the methods necessarily used in their mass production, accommodate the forming of cutting edges sufficiently sharp readily to sever the new tapes in accordance with old practices.

Accordingly, a general object of the present invention is to provide an inexpensively produced and highly improved tape dispenser for severing elastomeric type adhesive tape, as well as other types of tape. A further object of the invention is to provide a tape dispenser comprising a pair of movable jaws having cooperating cutting edges on intermeshing teeth for severing a length of tape when the jaws are moved from an open position into a closed position, the construction and arrangement of the teeth being such that they bring about excellent severing of the tape in spite of the fact that they need be neither extremely sharp nor especially close fitting. Because of this latitude in the quality of the cutting edges, the teeth may be formed of plastic and other materials inexpensive to form. Another object of the invention is to provide a tape dispenser of the character noted wherein the tape is perforated at a plurality of points progressively from the edges of the tape toward its center, and wherein the tape is severed progressively in diverging directions leading away from each of the perforations, the tape at all times being closely supported about the locations of the perforations and along the diverging lines of severance to minimize stretching of the tape and thus produce very efficient cutting of the tape despite its elastic qualities. In order to carry out the operation in the manner just stated, the present dispenser is provided with two opposed rows of saw-tooth shaped teeth, one row sweeping through the notches between the teeth of the other row during the severing action. The side edges of the teeth of both rows cooperate to cut the tape as they are moved past each other. However, the teeth of one row project at an angle with respect to the teeth of the other so that the points of a first set of teeth engage and puncture the tape at locations corresponding to the bases or bottoms of the notches of the second set before the co-operating side edges of those particular teeth begin their cutting. The base portions of the second set of teeth provide support for the tape around substantially three sides of each point of perforation, thereby permitting the punctures to be made without substantial stretching of the tape. Following each puncture, the cooperating side edges of the teeth, which are also at an angle with respect to each other, in effect enlarge the puncture by simultaneously cutting the tape outwardly in two directions leading progressively away from the original perforation. These lines of severance meet with others to effect the complete parting of the tape, but while this action is in progress the presence of the first row of teeth within the progressively enlarged punctures acts to anchor the tape in place. This, plus the fact that the body portions of the second row of teeth support the tape along the lines of severance, prevents stretching of the tape during the actual cutting thereof. Furthermore, any tendency the tape might have to be pulled into a wedging position between the rows of teeth as the cutting progresses is overcome by the points of the second set of teeth which tend to hook or gouge into the tape and further anchor it in fixed position.

Still another object of the invention is to provide a dispenser, as described above, having a casing for enclosing a roll of tape and an opening through which a length of tape may be withdrawn from the roll in a path between the cutting edges when the jaws are open, one of the jaws comprising a cover member pivotally mounted upon the casing and arranged to cover the opening and the cutting edges when the jaws are in a closed position. Yet another object of the invention is to provide the casing with a shoulder to which a portion of the length of withdrawn tape will detachably adhere after the tape is severed and thereby be maintained in a bridging path between the shoulder and the roll of tape in position to be grasped by the fingers when the jaws are opened preparatory to withdrawal of another length of tape.

These and other objects and advantages of the method and apparatus of the present invention will be apparent from the following description of one form of the apparatus, taken with the accompanying drawing wherein:

Fig. 1 is a perspective view of a tape dispenser embodying the present invention;

Fig. 2 is an enlarged fragmentary sectional view taken longitudinally through the dispenser showing the relationship of the teeth immediately prior to their engagement with the tape for severing the same as the cover member or upper jaw is moved into a closed position;

Fig. 3 is a fragmentary view of the upper portion of the front of the dispenser, showing the concave relationship of the row of upper cutting teeth with respect to the plane of the lower teeth, the concave relationship being slightly exaggerated for illustrative purposes;

Fig. 4 is a view similar to Fig. 2 but showing the positions of the parts when the cover member is in a fully closed position after the tape has been severed; and Fig. 5 is a fragmentary sectional view, on yet a larger scale, taken along line 5—5 of Fig. 4 and showing portions of the teeth of each jaw in intermeshing relationship when the cover member is in a fully closed position.

In the drawing, the numeral 10 designates a casing for enclosing a roll 11 of adhesive tape wound in the usual manner about a core 12. The principal part of the casing is fabricated in two single-piece portions which may be molded or otherwise formed of plastic or the like. One of these portions provides a front wall 13 for the casing. This front wall has the peripheral shape illustrated in Fig. 1, and has provided therein a centrally arranged circular opening 14. The other principal portion of the casing provides the back wall 15 of the casing, and has formed therein a similar centrally arranged circular opening (not shown). Also, the back wall 15 has formed thereon a hollow cylindrical hub 16 extending co-axially between the opening 14 and the corresponding opening in the back wall 15 to provide a finger hole through the casing, the core 12 of the roll of adhesive tape being rotatably supported between the walls 13 and 15 on the outer surfaces of the hub 16, as best illustrated in Figs. 2 and 4. The walls 13 and 15 have the same general configuration and shape, but the back wall 15 has a forwardly extending bottom wall 17 (Fig. 1) for the casing formed integrally thereon as well as forwardly extending side walls 18 and 19, the wall 19 having a transversely extending strengthening rib 20 (Fig. 2) formed integrally therewith. The forward edges of these side walls and the bottom wall are recessed to provide a recessed ledge (see particularly Fig. 1) for receiving the bottom and side edges of the front wall 13, the front wall in effect being received between the outer edge portions of the bottom and side walls 17, 18 and 19, respectively, with the outermost surface of the wall 13 being flush therewith. The mating of the edges of the wall 13 with the ledge may be interrupted at convenient locations by identical lock joints 22 of a well known type, each of which may include an inwardly extending overhanging lip 23 formed on the outer edge of the sides or bottom wall, as the case may be. In this type lock joint the lip is snugly received in a cooperating cavity formed in the outer edge and outermost surface of the wall 13, the inner portion of each cavity comprising an outwardly extending lip closely underlaying the inwardly extending lip 23. In assembling the principal parts of the casing, the lips 23 and the cavity lips are sprung past each other into an interlocking position, thereby retaining the front wall 13 in place with respect to the back wall 15 and the associated side and bottom walls.

The top of the casing is open and is provided with a cover member 24 which, when in the closed position shown in Fig. 4, provides the upper portion of the dispenser with somewhat the same gracefully curved configuration characteristic of the bottom portion thereof. The lefthand end of the cover member, as viewed in Figs. 2 and 4, is pivotally mounted upon the casing by means of laterally extending pins 25 formed on the cover member and journaled in appropriate openings in the front and back walls of the casing. The pivotally connected end of the cover member 24 is provided with a downwardly extending skirt 26 that mates with the upper end of the side wall 19 of the casing when the cover is closed, and the cover is provided along its side edges with two downwardly extending flanges 27 which may be grasped between the fingers for raising or lowering the cover member. Each of these flanges lies in the plane of the corresponding one of the front or back walls and has a gracefully curved lower edge of a configuration complementing the configuration of the corresponding upper edge of the front or back wall for closely mating therewith to provide a positive lower stop for the lid when it is in the closed position.

The upper portion of the side wall 18 and the free end of the cover member 24 comprise a pair of movable jaws and each is provided with a transversely extending row of pointed saw-tooth shaped teeth designated by the reference numbers 28 and 29, respectively, the edges of the teeth defining a pair of serrated cutting edges. The upper teeth 29 intermesh with the outer side of the lower teeth 28 and are disposed between the cover flanges 27 and beneath an overhang 30 of the top of the cover member whereby the cover member and the teeth 29 substantially enclose the teeth 28 when the cover is in a closed position, as shown in Fig. 4. As more fully explained in the following description, the upper teeth 29 project at an angle with respect to the lower teeth 28 and, as the jaws are being closed, the teeth 29 sweep through the notches separating the lower teeth or serrations and cooperate with the edges thereof to sever a length of tape arranged between the jaws.

Considering the structure in greater detail, the upper portion of the side wall 18 is provided with an upstanding block or shoulder 31 which extends above the upper extremities of the front wall 13 and the back wall 15 of the casing. This block has a top planar surface 32 (Fig. 1) having a transversely extending and substantially straight inner edge. The outer end of this planar surface terminates in the row of teeth 28 which form a serrated cutting edge comprising V-shaped pointed serrations and a plurality of V-shaped intervening notches 34 (Fig. 1). The adjacent outer vertical face of the block 31 is provided with a plurality of strengthening ribs 35 comprising downward extensions of the serrations, and a plurality of intervening grooves 36 comprising downward extensions of the notches. The block 31 may be further strengthened by an inner transversely extending bracing rib 37 and a central upstanding bracing member 38. The serrations or teeth 28 are of substantially identical shape and size, the arrangement being such that the inner apices of the notches 34 are substantially transversely aligned, as are the apices or points of the serrations 28. The side edges of each adjacent pair of serrations comprise a pair of cutting edges 39 (Fig. 1) that extend in diverging directions from the inner apex of the intervening notch.

As previously noted, the upper row of teeth 29 are arranged to sweep through the notches 34 and are disposed at an angle to the lower serrations or teeth 28. To this end, the outer surface 40 of the upper teeth extends downwardly from the inner side of the cover member 24 and at an angle toward the pivotally mounted end of the cover member, as best shown in Figs. 2 and 4. The lower edge of the surface 40 terminates in the serrated cutting edge, previously noted and includes a plurality of V-shaped pointed teeth 29 and a plurality of V-shaped intervening notches 42 (Fig. 1). The upper teeth are substantially triangular in vertical section and the inner side of each tooth is beveled to form a rib having a rear edge 43 (Figs. 2 and 5) extending upwardly from the point or apex of the tooth to the inner surface of the cover member, the edge 43 extending substantially normal to the plane of the lower serrations 28 when the jaws are in the relative position shown in Figs. 2 to 4, inclusive. The ribs and edges 43 are spaced by intervening upwardly extending V-shaped grooves 44 (Fig. 5) extending upwardly from the notches 42 to the inner surface of the cover member, the arrangement being such that, broadly speaking, the corresponding grooves and ribs of the upper teeth 29 and lower serrations 28 intermesh as the jaws are moved into a closed position, as shown in Figs. 4 and 5.

The outer surface 40 of the upper teeth is slightly concave, as best shown in Figs. 2 and 4, to cause the points of the teeth 29 to lie along a curved line that would lie substantially in a plane normal to the plane of the surface 32. This relation is best shown in Fig. 3 wherein the construction is slightly exaggerated for purposes of illustration. Also, the points or apices of the teeth 29 are substantially transversely aligned, the arrangement being such that each point directly overlies the inner apex of a lower notch 34 when the jaws are in the position shown in Figs. 2 and 3. The side edges of each upper tooth 29 comprise a pair of cutting edges 45 (Fig. 3) which extend from the apices of the adjacent notches 42 and converge at the point of the tooth. These converging cutting edges 45 cooperate with the converging cutting edges 39 of the lower teeth to sever the tape as the jaws are closed.

From the foregoing description it will be apparent that as the jaws are moved into a closed position, the points of the upper teeth 29 engage and puncture the tape at the inner apices of the lower notches 34 progressively from the edges of the tape toward its center. Due to the angle of the teeth 29 with respect to the plane of the lower serrations 28, the pair of side cutting edges 45 on each upper tooth are disposed at an acuate angle with respect to the corresponding cooperating lower cutting edges 39. Thus, the cutting edges 39 and 45 sever the tape progressively from each puncture outwardly along the converging cutting edges 39 as the jaws are moved into a closed position and as the teeth 29 sweep through the notches 34.

As initially noted, the present structure is especially useful for severing tape of a resilient character because there is little tendency to stretch the tape. Upon analysis it will be seen that one or more factors are present in every phase of the severing operation serving to overcome this difficult problem. For example, when the points of the upper teeth 29 engage and puncture the tape lying across the block 31, the punctures are made at the inner apices of the lower notches where the surface 32 of the block and the base portions of the lower teeth 28 closely support the tape on substantially three sides of all but the outermost punctures. This avoids any substantial stretching of the tape during the puncturing phase of the operation. During the severing phase, on the other hand, the lower teeth 28 support the tape immediately adjacent every portion of the line of severance and the presence of the upper teeth within the punctures tends to anchor the tape and prevent it from being pulled forwardly across the top of the block 31. Any tendency the tape might have to be pulled forwardly and downwardly over the forward edge of the block into wedged position between the intermeshing upper and lower teeth is further prevented by the points on the lower teeth which will gouge into the underside of the tape and not only tend further to anchor the tape but also to perforate the tape if the downward pull becomes excessive. These factors, both individually and in concert, contribute to the unusual efficiency of the severing operation.

It will of course be understood that the present dispenser severs the tape along a transverse saw-tooth shaped line having a first set of spaced and pointed apices on one side of the median of the line and a second set of apices on the other side of the median. In its operation, the tape is punctured and anchored at the locations of one set of the apices progressively from the opposite edges of the tape toward its center, and the tape is progressively severed along the line from each of the punctures simultaneously in directions toward a pair of apices of the second set, the tape being continously supported along one side of the line during the puncturing and severing. This dispenser has proven highly effective for severing tough, resilient tape of the elastomeric type which easily stretches unless properly anchored or supported. Moreover, the progressive puncturing and cutting operations minimize the manual effort needed at any one moment to close the jaws of the tape dispenser during the severing operation and accommodate severing of the tape along a clean, even line without materially stretching the tape as the jaws are closed in a smooth even motion. One of the important advantages of this dispenser is that it may be very simple and relatively inexact in construction. Thus, the lower serrations 28 and the upper teeth 29 may be formed of plastic and, although their cutting edges 39 and 45 constitute fairly fine lines, the cutting edges need not be knife sharp and need not cooperate in an especially fine shearing relationship. The teeth are thus inexpensive to form and may easily be manufactured on a mass production basis.

The roll of adhesive tape 11 is placed in the casing 10 of the present dispenser at the time the dispenser is assembled, the core 12 of the roll being rotatably supported on the hub element 16 while the two halves of the dispenser are brought into proper assembled relationship, the cover member mounting pins 25 being received in the openings therefor in the front and back walls of the dispenser. The mounting pins 25 and the upper teeth 29 may be formed integrally with the cover member 24 and the lower serrations or teeth 28 may be formed integrally with the side wall 18. When this is done, it will be noted that the entire dispenser consists of only three individual pieces. These three pieces, broadly, are the front wall 13, the back wall 15, and the cover member 24, all of the other parts of the dispenser being formed integrally with one or the other of these three parts. It will thus be understood that the present dispenser may be manufactured and assembled rapidly and inexpensively and that it may be sold in its assembled condition containing the roll of tape 11.

The first time the dispenser is used the cover member 24 is first lifted to open position (Fig. 1) and the end of the roll of tape is grasped in the fingers and pulled outwardly through the open top of the casing. The unrolled length of tape 11a, while under tension, is laid across the planar surface 32 of the block 31, to which it adheres, and the cover member is then moved by the fingers towards its closed position. As the cover member and the upper teeth move into closed position the tape is severed in the manner discussed above. Having been cut to desired length, the severed portion of the tape is free to be used as the operator may desire, and upon completion of the severing action, the cover member 24 will be in its fully closed position where it completely closes the casing and maintains the roll of tape in a sanitary condition. The end of the tape 11a that remains within the casing is retained in position ready to be grasped whenever the cover member 24 is again opened for the purpose of withdrawing and severing another length of the tape. In this regard it will be noted that the adhesive coating on the underside of the end 11a of the tape causes that portion of the tape to adhere to the top planar surface 32 of the block 31, thus causing the tape in effect to maintain itself in a bridged condition across an unobstructed space between the roll of tape 11 and the surface 32 where it may easily be grasped by the fingers. As a consequence, when the operator again wishes to withdraw and sever another length of tape, he need only lift the cover, grasp the end 11a of the tape where it is bridged between the surface 32 and the roll of tape, and withdraw the length desired, whereupon the cover member may again be moved into a closed position to sever the newly withdrawn length of tape.

The foregoing description has been given for clearness of understanding only, and no unnecessary limitation should be implied therefrom, for it will be apparent to those skilled in the art that variations and changes may be made in the apparatus without departing from the spirit and scope of the appended claims.

We claim:

1. A tape dispenser to sever a length of tape from a supply thereof comprising, a pair of jaws movable between open and closed positions, a serrated edge on the outer side of one of said jaws, the serrations of said edge providing V-shaped notches therebetween, a row of pointed teeth on the inner side of the second one of said jaws arranged for sweeping motion through said notches when said jaws are moved from said open position to said closed position, and means for supporting a supply of tape in position wherein a length of tape may be withdrawn in a path between said serrated edge and said row of teeth when said jaws are in said open position, each of said teeth having a pair of side edges thereon converging at the point of the tooth and arranged to cooperate with the converging edges of adjacent serrations to sever said tape during said sweeping motion, said side edges of said teeth during said sweeping motion being disposed at an acute angle with respect to the plane of said serrated edge so that the points of said teeth first engage and perforate said tape at the inner apices of said notches where the body of said serrations closely support the tape about three sides of the areas of perforations, said side edges of said teeth thereupon cooperating with said side edges of said serrations during said sweeping motion progressively to sever said tape outwardly in divergent directions from the perforations.

2. A tape dispenser comprising, a casing having a cover thereon movable between open and closed positions, a serrated edge on said casing, the serrations of said edge having V-shaped notches therebetween, a row of pointed teeth on said cover arranged for sweeping motion through said notches when said cover is moved from its open position to its closed position, and means for supporting a supply of tape within said casing in position wherein said tape when said cover is in its open position may be withdrawn from said casing over said serrated edge, each of said teeth having a pair of side edges thereon converging at the point of the tooth and arranged to cooperate with the converging side edges of said serrations to sever said tape when said cover is moved to its closed position, said side edges of said teeth during said closing movement of said cover being disposed at an acute angle with respect to the plane of said serrated edge so that the points of said teeth first engage and perforate said tape at the inner apices of said notches where the body of said serrations closely support the tape about three sides of the areas of perforation, said side edges of said teeth thereupon cooperating with said side edges of said serrations during said closing movement of said cover progressively to sever said tape outwardly in divergent directions from the perforations.

3. A tape dispenser comprising, a casing having a cover thereon movable between open and closed positions, a serrated edge on said casing, the serrations of said edge having V-shaped notches therebetween, a row of pointed teeth on said cover arranged for sweeping motion through said notches when said cover is moved from its open position to its closed position, and means for supporting a supply of tape within said casing in position wherein said tape when said cover is in its open position may be withdrawn from said casing over said serrated edge, each of said teeth having a pair of side edges thereon converging at the point of the tooth and arranged to cooperate with the converging side edges of said serrations to sever said tape when said cover is moved to its closed position, said side edges of said teeth during said closing movement of said cover being disposed at an acute angle with respect to the plane of said serrated edge so that the points of said teeth first engage and perforate said tape at the inner apices of said notches where the body of said serrations closely support the tape about three sides of the areas of perforation, said side edges of said teeth thereupon cooperating with said side edges of said serrations during said closing movement of said cover progressively to sever said tape outwardly in divergent directions from the perforations, said teeth being arranged with respect to said serrations so that the points of said teeth progressively engage and perforate said tape at a plurality of points from the edges of the tape toward its center.

4. A tape dispenser for pressure sensitive adhesive tape comprising, a casing for enclosing a roll of tape, an upstanding block on said casing having a substantially flat surface thereon terminating at a serrated edge, means in said casing for rotatably supporting the roll of tape in position wherein the periphery of the roll is spaced from said upstanding block with an unobstructed space therebetween so that a length of tape may be withdrawn from the periphery of the roll in a longitudinal path bridging said unobstructed space and passing over said flat surface and said serrated edge, the length of tape detachably adhering to said surface and the portion thereof extending between the periphery of the roll and said surface being thereby maintained in bridged condition across said unobstructed space, a cover mounting on said casing and movable between opened and closed positions, said serrated edge having V-shaped notches therebetween, a row of pointed teeth on said cover arranged for sweeping motion through said notches when said cover is moved from its open position to its closed position, and means for supporting a supply of tape within said casing in position wherein said tape when said cover is in its open position may be withdrawn from said casing over said serrated edge, each of said teeth having a pair of side edges thereon converging at the point of the tooth and arranged to cooperate with the converging side edges of said serrations to sever said tape when said cover is moved to its closed position, said side edges of said teeth during said closing movement of said cover being disposed at an acute angle with respect to the plane of said serrated edge so that the points of said teeth first engage and perforate said tape at the inner apices of said notches where the body of said serrations closely support the tape about three sides of the areas of perforation, said side edges of said teeth thereupon cooperating with said side edges of said serrations during said closing movement of said cover progressively to sever said tape outwardly in divergent directions from the perforations.

5. A tape dispenser to sever a length of tape from a supply thereof comprising a pair of jaws movable between open and closed positions, a serrated edge on the outer side of one of said jaws, the serrations of said edge providing V-shaped notches therebetween, a row of pointed teeth on the inner side of the second one of said jaws arranged for sweeping motion through said notches when said jaws are moved from said open position to said closed position, and means for supporting a supply of tape in position wherein a length of tape may be withdrawn in a path between said serrated edge and said row of teeth when said jaws are in said open position, each of said teeth having a pair of side edges thereon converging at the point of the tooth and arranged to cooperate with the converging edges of adjacent serrations to sever said tape during said sweeping motion, said side edges of said teeth during said sweeping motion being disposed at an acute angle with respect to the plane of said serrated edge so that the points of said teeth first engage and perforate said tape at the inner apices of said notches where the body of said serrations closely support the tape about three sides of the areas of perforations, said side edges of said teeth thereupon cooperating with said side edges of said serrations during said sweeping motion progressively to sever said tape outwardly in divergent directions from the perforations, said teeth being arranged with respect to said serrations so that the points of said teeth progressively engage and perforate the tape at a plurality of points from the edges of the tape toward its center.

References Cited in the file of this patent

UNITED STATES PATENTS

| 567,295 | Coursen | Sept. 8, 1896 |
| 1,357,727 | Roach | Nov. 2, 1920 |
| 1,453,200 | Stacho | Apr. 24, 1923 |
| 1,675,196 | Uttz | June 26, 1928 |
| 2,001,731 | Jeneson | May 21, 1935 |
| 2,120,329 | Henneke et al. | June 14, 1938 |
| 2,275,409 | Anderson | Mar. 10, 1942 |
| 2,609,877 | Hanington | Sept. 9, 1952 |
| 2,635,693 | Gibby | Apr. 21, 1953 |
| 2,663,369 | Erhardt | Dec. 22, 1953 |
| 2,676,658 | King | Apr. 27, 1954 |

FOREIGN PATENTS

| 462,244 | Australia | Jan. 3, 1950 |